(12) United States Patent
Shibagaki

(10) Patent No.: US 8,591,373 B2
(45) Date of Patent: Nov. 26, 2013

(54) DIFFERENTIAL GEAR DEVICE FOR VEHICLE

(75) Inventor: Daisuke Shibagaki, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 254 days.

(21) Appl. No.: 12/524,289

(22) PCT Filed: Jan. 17, 2008

(86) PCT No.: PCT/JP2008/050557
§ 371 (c)(1),
(2), (4) Date: Aug. 4, 2009

(87) PCT Pub. No.: WO2008/093542
PCT Pub. Date: Aug. 7, 2008

(65) Prior Publication Data
US 2009/0325754 A1    Dec. 31, 2009

(30) Foreign Application Priority Data
Feb. 2, 2007    (JP) .................................. 2007-024919

(51) Int. Cl.
*F16H 48/06*    (2006.01)

(52) U.S. Cl.
USPC .......................................... 475/230; 475/246

(58) Field of Classification Search
USPC .......................................... 475/246, 247, 230
See application file for complete search history.

(56) References Cited

U.S. PATENT DOCUMENTS

| 2,548,258 | A | * | 4/1951 | Griffith | 475/246 |
| 6,027,423 | A | * | 2/2000 | Bell | 475/246 |
| 6,802,793 | B2 | * | 10/2004 | Zink et al. | 475/230 |
| 6,958,030 | B2 | * | 10/2005 | DeGowske | 475/231 |

FOREIGN PATENT DOCUMENTS

| EP | 0 731 291 A2 | 9/1996 |
| EP | 1 734 288 A2 | 12/2006 |
| JP | 60-121555 U | 8/1985 |

(Continued)

OTHER PUBLICATIONS

Extended European Search Report (EESR) for corresponding European Patent Application No. 08 70 3411 dated Oct. 27, 2010.

(Continued)

*Primary Examiner* — Derek D Knight
(74) *Attorney, Agent, or Firm* — Sughrue Mion, PLLC

(57) ABSTRACT

A differential gear device for a vehicle capable of improving durability without causing vibration and noise is provided. At least a part of a supporting portion 68 of a pinion shaft 56 that supports a pinion gear 60 and at least a part of a fitting hole 66 of the pinion gear 60 into which the pinion shaft 56 is inserted respectively have tapered surfaces 70 and 72 each having a diameter decreasing toward an outer circumference of the supporting portion or the pinion gear. Driving force is transmitted from a differential case 50 to side gears 58*l* and 58*r* through the pinion shaft 56 and the pinion gear 60 rotatably supported. Here, the pinion gear 60 is moved outward in the axial direction of the pinion shaft 56 according to the engagement reaction force between the pinion gear 60 and the side gears 58*l* and 58*r*. As a result, the fitting clearance C between the pinion shaft 56 and the pinion gear 60 increases with an increase in torque transfer load, whereby high durability of the differential gear device is obtained.

3 Claims, 3 Drawing Sheets

(56) References Cited

FOREIGN PATENT DOCUMENTS

| | | |
|---|---|---|
| JP | 08-049758 A | 2/1996 |
| JP | 08-261313 A | 10/1996 |
| JP | 09-193815 A | 7/1997 |
| JP | 09-303533 A | 11/1997 |
| JP | 2000-291781 A | 10/2000 |
| JP | 2001-146952 A | 5/2001 |
| JP | 2001-153213 A | 6/2001 |
| JP | 2002-145081 A | 5/2002 |
| JP | 2004-068873 A | 3/2004 |
| JP | 2004-360807 A | 12/2004 |

OTHER PUBLICATIONS

Japanese Office Action for JP Patent Application No. 2007-024919 mailed May 17, 2011.

* cited by examiner

DIFFERENTIAL GEAR DEVICE FOR VEHICLE

CROSS REFERENCE TO RELATED APPLICATION

This application is a National Stage of International Application No. PCT/JP 2008/050557 filed Jan. 17, 2008, claiming priority based on Japanese Patent Application No. 2007-024919, filed Feb. 2, 2007, the contents of all of which are incorporated herein by reference in their entirety.

TECHNICAL FIELD

The present invention relates to a differential gear device for a vehicle, and especially relates to a technique for obtaining both anti-seizing property and low-noise characteristic in the differential gear device.

BACKGROUND ART

It is known a vehicle provided with a differential gear device that transmits power from a driving source to a right driving wheel and a left driving wheel with allowing a relative rotation therebetween. Such a differential gear device for a vehicle generally comprises a differential case, a pinion shaft, side gears and pinion gears. The differential case is drivably rotated by power from a power source of the vehicle to transmit the power from the power source to the right and left driving wheels, with allowing relative rotation of the right and left driving wheels. The pinion shaft of a cylindrical shape is fixed to the differential case in the direction orthogonal to the rotational axis thereof. The side gears are provided in the differential case coaxially with the rotational axis thereof in an opposing manner intervening the pinion shaft, to be rotated with the right and left driving wheels. The pinion gears are rotatably supported by the pinion shaft. Patent Document 1 discloses one example of the differential gear device for the vehicle.

Patent Document 1: Japanese Patent Publication No. 9-303533

DISCLOSURE OF THE INVENTION

Subject to be solved by the Invention

In the above conventional differential gear device for the vehicle, the pinion gears tend to rotate in high rotation speed, and are used under conditions of high planar pressure and high sliding speed. Accordingly, high anti-seizing property is required for the pinion gears. An effective solution for this problem is to increase a fitting clearance between the pinion gears and the pinion shaft. However, the increased fitting clearance between the pinion gears and the pinon shaft causes a problem of vibration and noise which impair a vehicle driving performance. Thus, there is an incompatible relation between the durability improvement by the fitting clearance and the vibration and noise generation due to the fitting clearance, between the pinion gears and the pinion shaft. Accordingly, method of increasing the fitting clearance between the pinion gears and the pinion shaft has been hardly adopted for improving the durability.

The invention was accomplished considering the above situation, and has an object to provide a differential gear device for a vehicle that can improve durability of the pinion gears and the pinion shaft by increasing the fitting clearance therebetween, without causing vibration and noise thereof.

For achieving the above object, a first aspect of the present invention relates to a differential gear device for a vehicle, including a differential case that is drivably rotated by power from a power source of a vehicle, a pinion shaft that is fixed to the differential case in a direction orthogonal to a rotational axis of the differential case, side gears that are provided in the differential case coaxially with the rotational axis of the differential case with intervening the pinion shaft to be rotated together with a right driving wheel and a left driving wheel, and a pinion gear (or pinion gears) that is (are) rotatably supported by the pinion shaft, the differential gear device for the vehicle transmitting the power from the power source to the right and left driving wheels with allowing relative rotation of the right and left driving wheels. The differential gear device for the vehicle comprises at least a part of a supporting portion of the pinion shaft that supports the pinion gear and at least a part of a fitting hole of the pinion gear into which the pinion shaft is inserted respectively have tapered surfaces each having a diameter decreasing toward an outer circumference of the supporting portion or the pinion gear.

A second aspect, in the first aspect, further comprises a pressing member that presses the pinion gears inward in an axial direction of the pinion shaft.

In a third aspect, in the second aspect, the pressing members is a disc spring that is interposed between an end face of the pinion gear and the differential case.

In a fourth aspect, in the third aspect, the disc spring is a washer having a partially spherical convex disk shape and being made of a metal material of relatively low friction and high abrasion resistance, the washer being inserted between an end face of the pinion gear and the differential case and being plastically deformed.

Effect of the Invention

The differential gear device for the vehicle according to the first aspect of the present invention comprises at least the part of the supporting portion of the pinion shaft that supports the pinion gear and at least the part of the fitting hole of the pinion gear into which the pinion shaft is inserted respectively have tapered surfaces each having the diameter decreasing toward the outer circumference. Accordingly, when the driving force is transmitted from the differential case to the side gears through the pinion shaft and the pinion gears rotatably supported thereby, the pinon gears are moved outward in the axial direction of the pinion shaft according to the engagement reaction force between the pinion gears and the side gears. As a result, the fitting clearance between the pinion shaft and the pinion gear increases with the increase in the torque transfer load to render high durability of the differential gear device.

The differential gear device for the vehicle according to the second aspect of the present invention further comprises the pressing member that presses the pinion gears inward in the axial direction of the pinion shaft. Accordingly, the engagement reaction force between the pinion gear and the side gears decreases with the decrease in the torque transfer load, whereby the pinion gears are moved inward in the axial direction of the pinion shaft. As a result, the fitting clearance between the pinion shaft and the pinion gears reduces to suitably suppress generation of the vibration and noise under the low load.

In the differential gear device for the vehicle according to the third aspect of the present invention, the pressing member is the disc spring that is interposed between the end face of the pinion gear and the differential case. Accordingly, the pressing members can be provided without enlarging size of the differential gear device.

In the differential gear device for the vehicle according to the fourth aspect of the present invention, the disc spring is the washer having the partially spherical convex disk shape and being made of the metal material of relatively low friction and high abrasion resistance, the washer being inserted between an end face of the pinion gear and the differential case and being plastically deformed. Accordingly, one part i.e., one piece can serve both the washer and the disc spring, which further downsizes the differential gear device.

EXPLANATION OF REFERENCES

Figure 1:
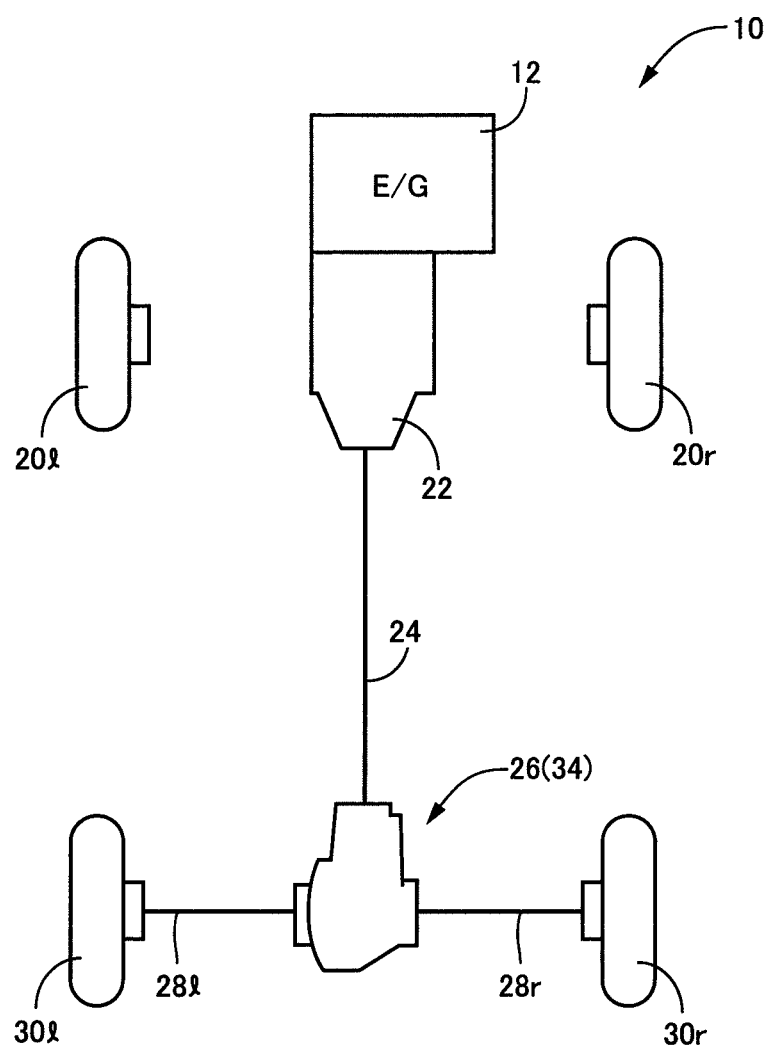
FIG. 1 is a view showing a power transmission system of a FR vehicle including a differential gear device to which to one embodiment of the invention is applied.

12: engine (power source)
34: differential gear device
50: differential case
56: pinion shaft
58$l$, 58$r$: side gear
60: pinion gear
64: washer (disc spring)
66: fitting hole
68: supporting portion
70: tapered surface
72: tapered surface

BEST MODE FOR CARRYING OUT THE INVENTION

Hereinafter, embodiments of the present invention are described in detail with reference to the drawings.

FIG. 1 is a view explaining a power transmission mechanism of a front-engine rear-drive (FR) type vehicle 10 having a differential gear device 34 i.e., differential gear 34 to which one embodiment of the present invention is applied. In the FIG. 1, the vehicle 10 comprises an engine 12 that is a power source, a pair of a right front wheel 20$r$ and a left front wheel 20$l$, an automatic transmission 22 for changing the output rotation of the engine 12, a propeller shaft 24 for transmitting driving force output from the output shaft of the automatic transmission 22, and a final reduction gear 26 that functions as a driving force distribution apparatus for rear wheels. The vehicle 10 further comprises a pair of a right rear-wheel axle 28$r$ and a left rear-wheel axle 28$l$ for transmitting the driving force distributed by the final reduction gear 26 and a pair of a right rear drive wheel 30$r$ and a left rear drive wheel 30$l$ to which the driving force is transmitted through the rear-wheel axles 28$l$ and 28$r$.

The engine 12 is a gasoline engine, diesel engine, or like combustion engine that generates driving force by combustion of a fuel injected in a cylinder, for example. The automatic transmission 22 is a step variable automatic transmission, for example, which decreases or increases the rotation inputted from the engine 12 at a predetermined gear ratio γ and then outputs the rotation. Forward gear positions, reverse gear position or neutral is selectively set to perform a speed change corresponding to respective gear ratio γ. An input shaft of the automatic transmission 22 is connected to an output shaft of the engine 12 through a torque converter or the like (not shown).

Figure 2:
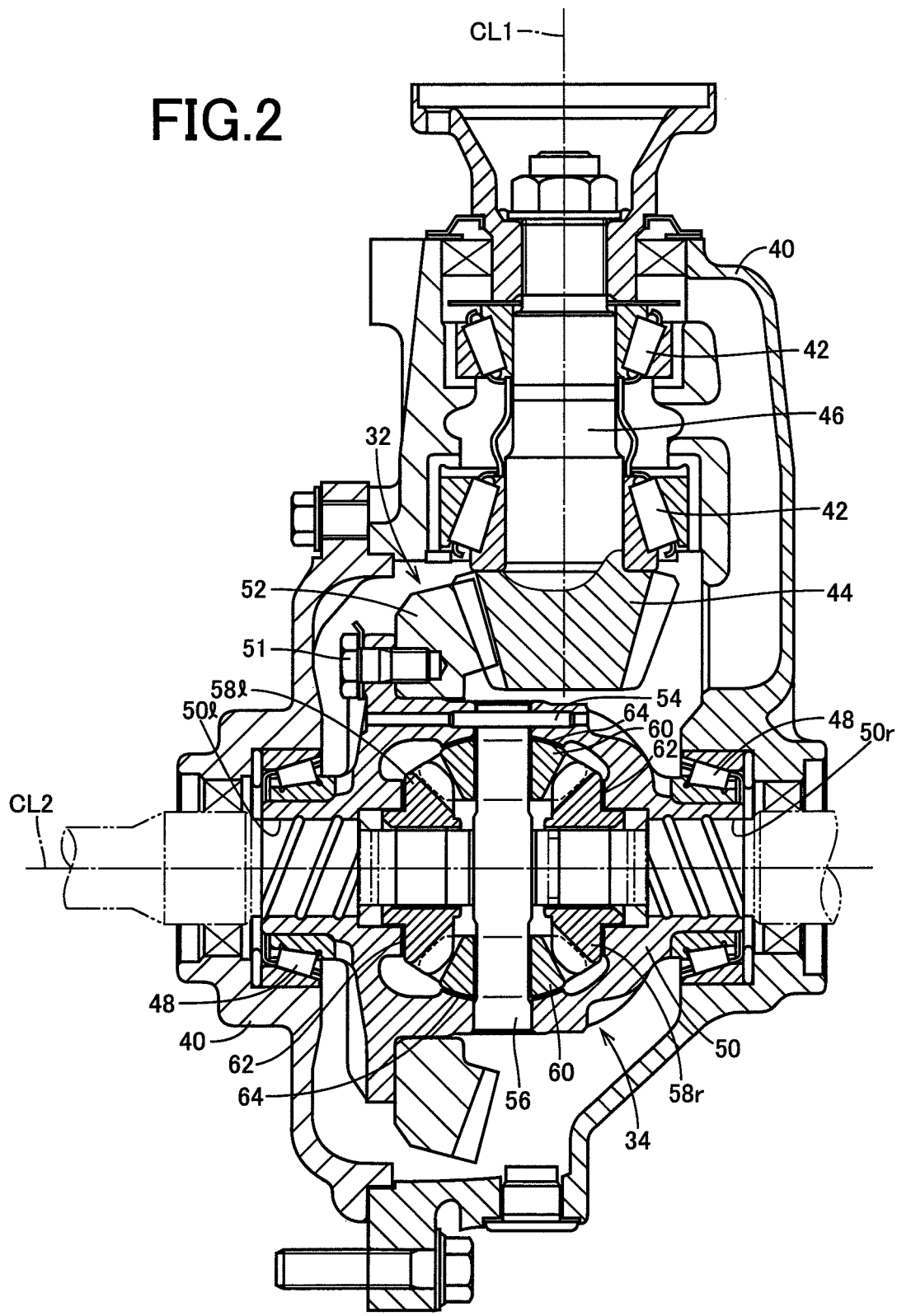
FIG. 2 is a principal sectional view explaining a structure of a final reduction gear including the differential gear device of FIG. 1.

FIG. 2 is a view explaining a structure of the final reduction gear 26. The final reduction gear 26 accommodates a reduction gear 32 and a differential gear device 34 in a differential housing 40. The rotation transmitted from the engine 12 through the automatic transmission 22 and the propeller shaft 24 is slowed down by the reduction gear 32, and then transmitted to the pair of rear-wheel axles 28$l$ and 28$r$ by the differential gear device 34 with allowing relative rotation therebetween.

In the differential housing 40, a differential input shaft 46, a differential case 50, a large-diameter bevel gear 52, a pinion shaft 56, a pair of side gears 58$l$ and 58$r$, and a pair of pinion gears 60 are provided. The differential input shaft 46 is rotatably supported by the differential housing 40 through a pair of bearings 42, with one axial end connected to the axial end of the propeller shaft 24 through a universal coupling (not shown), and other axial end provided with a small-diameter bevel gear 44. The differential case 50 made of cast iron, for example, is rotatably supported by the differential housing 40 through a pair of bearings 48 about an axis CL2 that is orthogonal to an axis CL1 of the differential input shaft 46. The large-diameter bevel gear 52, fixed to an outer circumference of the differential case 50 with a bolt 51, engages with the small-diameter bevel gear 44.

The pinion shaft 56 supported at both ends by the differential case 50, is fixed to the differential case 50 at one end with a dowel pin 54 in a direction orthogonal to the rotational axis CL2 of the differential case 50. The pair of side gears 58$l$ and 58$r$ are rotatably supported by the differential case 50 about the axis CL2 with intervening the pinion shaft 56 therebetween. The pair of pinion gears 60 are rotatably supported by the pinion shaft 56 penetrating therethrough, and engage with the pair of side gears 58$l$ and 58$r$, respectively.

Axial ends of the pair of rear-wheel axles 28$l$ and 28$r$ are fitted into a pair of through-holes 50$l$ and 50$r$ formed in the differential case 50 in the direction of the axis CL, and are connected to the pair of side gears 58$l$ and 58$r$ by spline fittings. Further, a pair of circular washers 62 are inserted between the end faces of the pair of side gears 58$l$ and 58$r$, and the inner-side opening edges of the supporting through-holes 50$l$ and 50$r$ of the differential case 50. Washer 64 of partially spherical convex disc shape has in a center a hole to receive the pinion shaft 56 running therethrough, and is inserted between an outer circumferential end face of each of pinion gears 60 and an inner wall surface of the differential case 50. Both the washers 62 and the washers 64 are made of abrasion resistant metal, such a lead-base or Sn-base bearing metal for example, or metal of such an alloy further imparted with spring property as required.

In the thus-constituted final reduction gear 26, the reduction gear 32 is constituted of the small-diameter bevel gear 44 of the differential input shaft 46 and the large-diameter bevel gear 52 that engages therewith, so that rotation of the differential input shaft 46 is transmitted to the differential case 50 with slowed-down. For the small-diameter bevel gear 44 and the large-diameter bevel gear 52, a hypoid gear and a spiral bevel gear are suitably used. Further, the differential gear device 34 is constituted of the differential case 50, the pair of side gears 58$l$ and 58$r$, the pinion gears 60 rotatably supported by the pinion shaft 56, and the like.

Figure 3:
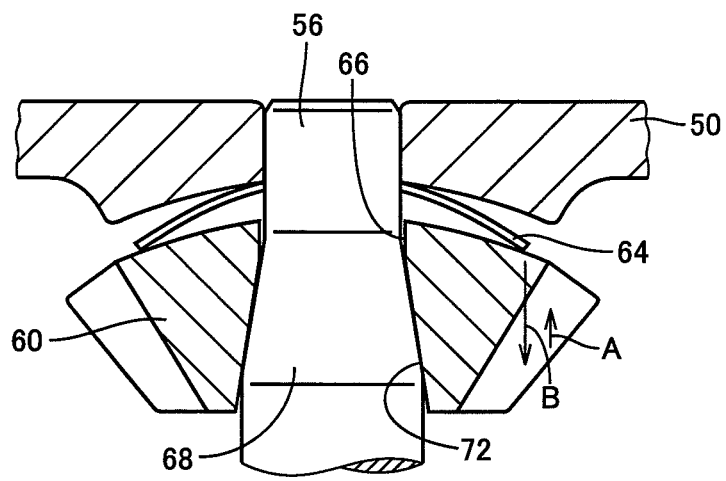
FIG. 3 is an enlarged view of a structure of a pinion shaft and a pinion gear rotatably supported thereby, in a state of low-load driving.
Figure 4:
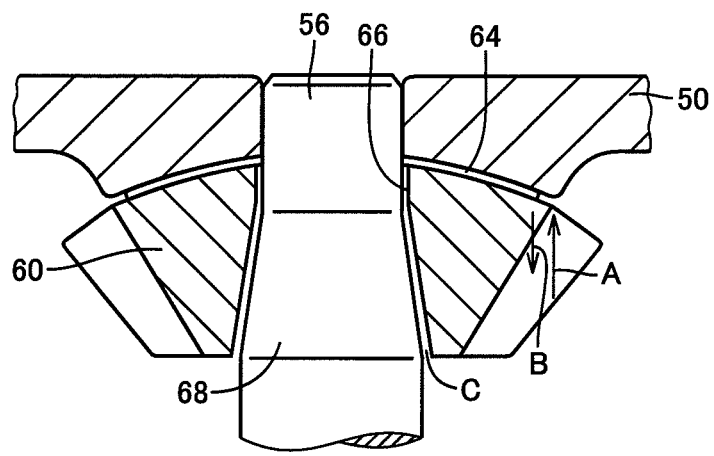
FIG. 4 is an enlarged view of a structure of a pinion shaft and a pinion gear rotatably supported by thereby, in a state of high-load driving.

FIGS. 3 and 4 are enlarged views for explaining in detail structures of the axial end of the pinion shaft 56 fixed to the differential housing 40 and a pinion gear 60 rotatably supported by the pinion shaft 56. FIG. 3 shows a state where the torque transfer load from the differential case 50 to the side gears 58*l* and 58*r* is small, while FIG. 4 shows a state where the torque transfer load is large. In FIG. 3 and FIG. 4, for the purpose of facilitating understanding of the operation and effects, the movement amount and the gap size of the pinon gear 60 are exaggerated.

As shown in FIG. 3 and FIG. 4, on a portion of the longitudinal pinion shaft 56 inserted into a fitting hole i.e., an engaging hole 66 of a pinion gear 60, that is, on an outer circumferential surface of the supporting portion 68 that supports the pinion gear 60 and an inner circumferential surface of the fitting hole 66 of the pinion gear 60, a tapered surface 70 and a tapered surface 72 each having a center on the axis CL2 and having a diameter decreasing toward the outer circumference are formed, respectively. The tapered surface 70 may be an entire axial part of the pinion shaft 56 inserted into the fitting hole 66 of the pinion gear 60, or may be a part thereof as shown in FIG. 3 and FIG. 4. Similarly, the tapered surface 72 may be an entire axial part of the fitting hole 66 of the pinion gear 60, or may be a part thereof as shown in FIG. 3 and FIG. 4.

Further, the washers 64 are inserted between the outer circumferential end faces of the pair of pinion gears 60 and the inner wall surface of the differential case 50. Each of the washers 64 is press-molded to have a shape with a curvature radius smaller than the curvature radius of the outer circumferential end face of the pinion gears 60 and the inner wall surface of the differential case 50. They function as disc-like springs that press (urges) the pinion gears 60 toward inner circumference having the axis-CL2 as the center, i.e., toward side of the axis CL2.

Accordingly, when the torque transfer load from the differential case 50 to the side gears 58*l* and 58*r* is small, the engagement reaction force between the pinion gears 60 and the side gears 58*l* and 58*r* decreases. Therefore, a thrust "A" toward the outer circumference along the axis of the pinion gear 60 according to the engagement reaction force is smaller than a thrust B of the washers 64. Consequently, the pinion gears 60 are moved inward in the axial direction by the thrust of the washers 64, as shown in FIG. 3. As a result, when the vehicle drives under the low load with the reduced fitting clearance C between the pinion shaft 56 and the pinion gear 60, generation of the vibration and noise under the low load is suitably suppressed.

Subsequently, when the torque transfer load from the differential case 50 to the side gears 58*l* and 58*r* is large, the engagement reaction force between the pinion gears 60 and the side gears 58*l* and 58*r* increases. The thrust "A" toward the outer circumference along the axis of the pinion gear 60 according to the engagement reaction force becomes lager than the thrust B by the washers 64. Consequently, as shown in FIG. 4, against the thrust of the washers 64, the pinion gears 60 move outward in the axial direction. As a result, when the vehicle drives under the high load, the large fitting clearance C between the pinion shaft 56 and the pinion gear 60 suppresses the abrasion between the pinion gears 60 and the side gears 58*l* and 58*r* upon the high load driving. Thus, durability of the pinion shaft 56 and the pinion gear 60 is improved.

As mentioned above, according to the differential gear device 34 for the vehicle of the present embodiment, the part of the supporting portion 68 of the pinion shaft 56 that supports the pinion gear 60 and the part of the fitting hole 66 of the pinion gear 60 into which the pinion shaft 56 is inserted, are formed by the tapered surfaces 70 and 72 having the diameter decreasing toward the outer circumference. The driving force is transmitted from the differential case 50 to the side gears 58*l* and 58*r* through the pinion shaft 56 and the pinion gears 60 rotatably supported thereby. Here, the pinion gears 60 move outward in the axial direction of the pinion shaft 56 according to the engagement reaction force between the pinion gears 60 and the side gears 58*l* and 58*r*. As a result, with the increase in torque transfer load, the fitting clearance C between the pinion shaft 56 and a pinion gear 60 increases. Thus, high durability of the pinion shaft 56 and the pinion gear 60 is rendered.

Further, according to the differential gear device 34 for the vehicle of the present embodiment, the pressing member (washer 64) that presses the pinion gear 60 inward in the axial direction of the pinion shaft 56 is provided. Accordingly, with the decrease in torque transfer load, the engagement reaction force between the pinion gears 60 and the side gears 58*l* and 58*r* decreases, so that the pinion gears 60 are moved inward in the axial direction of the pinion shaft 56. As a result, the reduced fitting clearance C between the pinion shaft 56 and the pinion gear 60 suitably suppresses generation of the vibration and noise under the low load.

Further, according to the differential gear device 34 for the vehicle of the present embodiment, the pressing member is the disc spring (washer 64) that is inserted between the end face of the pinion gear 60 and the differential case 50. Accordingly, the pressing member can be provided without enlarging the size of the differential gear device 34.

Further, according to the differential gear device 34 for the vehicle of the present embodiment, the disc spring is formed by plastically deforming the partially spherical, convex disk-shaped washer 64, made of the metal material with relatively low friction and high abrasion resistance. The washer 64 is inserted between the end face of the pinion gear 60 and the differential case 50. Accordingly, one part can serve both the washer and the disc spring, further downsizing the differential gear device 34.

In the above, the embodiments of the present invention in detail explained based on the drawing. However, the present invention is also applicable to other modes.

For example, the final reduction gear 26 including the differential gear device 34 of the above-mentioned embodiment was applied to a FR vehicle, but it may also be applied to other drive system such as FF vehicle, a 4WD vehicle, or like.

Further, in the vehicle of the above-mentioned embodiment, the step variable automatic transmission 22 is provided in the power transmitting path extending from the engine 12 to the pair of right and left rear wheels 30*l* and 30*r*. However, it may be replaced with a manual transmission or a continuously variable transmission.

Further, the differential gear device 34 of the above-mentioned embodiment is provided with the pair of pinion gears 60 rotatably supported by the pinion shaft 56. However, the number of pinion gears 60 may not necessarily be two. For example, when the pinion shaft 56 is trifurcated or has the shape of a cross, three or four pinion gears 60 may be provided.

Further, although the washers 64 that function also as the disc springs (pressing members) are used in the above-mentioned embodiment, a pressing member may be separately provided in addition to the washers 64.

Further, although the washers 64 that function also as the disc springs (pressing members) are used in the above-mentioned embodiment, the pressing member does not necessarily have to be provided. Even in absence of the pressing member, upon the high load driving, the tapered surfaces 70 and 72 reliably increases the fitting clearance C between the pinion shaft 56 and a pinion gear 60. Thus, with the suppressed abrasion between the pinion gears 60 and the side gears 58*l* and 58*r* upon the high load driving, the durability of the pinion gears 60 and the side gears 58*l* and 58*r* is improved.

Further, in the above-mentioned embodiment, the washers 64 also functioning as disc springs (pressing members) are press-molded (plastically deformed) to have the shape with the curvature radius smaller than the curvature radius of the outer circumferential end faces of the pinion gears 60 and the inner wall surface of the differential case 50. However, they may also have wavy shapes in the circumferential direction and be provided with a plurality of radially projecting rims. In short, the washers 64 can have various deformed shapes to function also as the disc spring.

The above explained are no more than some embodiments of the present invention, and the preset invention can be carried out with various modifications and improvements based on the knowledge of those skilled in the art.

The invention claimed is:

1. A differential gear device for a vehicle transmitting power from a power source to right and left driving wheels with allowing relative rotation of the right and left driving wheels, comprising:
   a differential case that is drivably rotated by the power from the power source of the vehicle,
   a pinion shaft that is fixed to the differential case in a direction orthogonal to a rotational axis of the differential case,
   side gears that are provided in the differential case coaxially with the rotational axis of the differential case such that the pinion shaft is provided therebetween, the side gears to be rotated together with the right and left driving wheels,
   a pinion gear that is directly rotatably supported by the pinion shaft,
   a tapered outer surface that is directly formed on at least a part of a supporting portion of the pinion shaft which supports the pinion gear, and
   a tapered inner surface that is directly formed on at least a part of a fitting hole of the pinion gear into which the pinion shaft is inserted,
   wherein the tapered outer surface and the tapered inner surface slidably contact with each other and have a diameter decreasing toward an outer circumference from the rotational axis, respectively,
   the differential gear device further comprising a pressing member that moves the pinion gear inward in an axial direction of the pinion shaft as an engagement reaction force between the pinion gear and the side gears decreases.

2. The differential gear device for the vehicle according to claim 1, wherein the pressing member is a disc spring that is interposed between an end face of the pinion gear and the differential case.

3. The differential gear device for the vehicle according to claim 2, wherein the disc spring is a washer having a partially spherical convex disk shape and being made of a metal material of relatively low friction and high abrasion resistance, the washer being inserted between an end face of the pinion gear and the differential case and being plastically deformed to have a shape with a curvature radius smaller than a curvature radius of an outer circumferential end face of the pinion gears and an inner wall surface of the differential case.

\* \* \* \* \*